United States Patent
Wijeratne et al.

(10) Patent No.: US 9,368,993 B2
(45) Date of Patent: Jun. 14, 2016

(54) METHOD AND APPARATUS FOR A MULTIPLEXED CONTACT BETWEEN ELECTRICAL DEVICES

(71) Applicant: Motorola Solutions, Inc., Schaumburg, IL (US)

(72) Inventors: Viranga L. Wijeratne, Duluth, GA (US); Donald L. Flowers, Dacula, GA (US); John E. Herrmann, Suwanee, GA (US); Bradley E. Long, Lawrenceville, GA (US); Frederick J. Weissinger, Duluth, GA (US)

(73) Assignee: MOTOROLA SOLUTIONS, INC., Schumburg, IL (US)

( * ) Notice: Subject to any disclaimer, the term of this patent is extended or adjusted under 35 U.S.C. 154(b) by 456 days.

(21) Appl. No.: 13/782,090

(22) Filed: Mar. 1, 2013

(65) Prior Publication Data

US 2014/0247011 A1  Sep. 4, 2014

(51) Int. Cl.
*H02J 7/00* (2006.01)
*H01H 47/00* (2006.01)
*H01M 10/46* (2006.01)
(Continued)

(52) U.S. Cl.
CPC .............. *H02J 7/007* (2013.01); *H01M 10/425* (2013.01); *H01M 10/4257* (2013.01); *H01M 10/44* (2013.01); *H01M 10/443* (2013.01); *H01M 10/46* (2013.01); *H01M 2010/4271* (2013.01); *H01M 2010/4278* (2013.01); *H02J 7/0042* (2013.01); *Y10T 307/858* (2015.04)

(58) Field of Classification Search
CPC ........... H02J 7/007; H02J 7/0063; H02J 1/00; H01M 10/46

USPC ......... 320/112, 137, 128, 134, 136, 150, 152, 320/164; 307/130; 327/93; 318/139; 713/340
See application file for complete search history.

(56) References Cited

U.S. PATENT DOCUMENTS 5,307,258 A * 4/1994 Schmidhauser ................ 363/98
5,576,610 A   11/1996 Patino et al.
5,606,242 A    2/1997 Hull et al.
(Continued)

FOREIGN PATENT DOCUMENTS

EP   2058915 A2   5/2009
WO  2009085915 A2   7/2009
WO  2011154781 A1  12/2011

OTHER PUBLICATIONS

Corresponding International Application No. PCT/US2014/016676—International Search Report mailed Jun. 30, 2014—13 pages.

*Primary Examiner* — Richard Isla Rodas
*Assistant Examiner* — David V Henze-Gongola
(74) *Attorney, Agent, or Firm* — Scott M. Garrett; Barbara R. Doutre (57) ABSTRACT

A method and apparatus for multiplexing an electrical contact interface between two electrical devices uses a time differentiated enablement of two or more different circuit elements in a first electrical device that are accessed via the multiplexed contact by a second electrical device. A timing control circuit in the first electrical device enables and disables circuit elements in the first electrical device coupled to a shared information contact over time. The second electrical device interacts with a first circuit element during an initial period upon connection to the first electrical device, and then interacts with a second circuit element after the initial period.

16 Claims, 4 Drawing Sheets

(51) Int. Cl.
*H01M 10/42* (2006.01)
*H01M 10/44* (2006.01)

(56) References Cited

U.S. PATENT DOCUMENTS

| | | | |
|---|---|---|---|
| 5,710,505 A | | 1/1998 | Patino |
| 6,054,843 A | * | 4/2000 | Oglesbee et al. ............ 320/136 |
| 6,771,051 B2 | | 8/2004 | Oglesbee et al. |
| 6,879,517 B2 | | 4/2005 | Geren et al. |
| 7,068,013 B2 | * | 6/2006 | Patino et al. .................. 320/150 |
| 7,233,126 B2 | | 6/2007 | Tashiro |
| 7,911,088 B2 | | 3/2011 | Mutabdzija et al. |
| 2007/0013341 A1 | * | 1/2007 | Hitomi et al. ................. 320/112 |
| 2013/0111251 A1 | * | 5/2013 | Leinonen et al. ............. 713/340 |
| 2013/0132614 A1 | * | 5/2013 | Bajpai et al. ..................... 710/10 |

\* cited by examiner

METHOD AND APPARATUS FOR A MULTIPLEXED CONTACT BETWEEN ELECTRICAL DEVICES

FIELD OF THE DISCLOSURE

The present disclosure relates generally to rechargeable batteries, and more particularly to multiplexing an information contact of a rechargeable battery.

BACKGROUND

In addition to rechargeable battery cells, a rechargeable battery pack, such as that used with portable and mobile devices, typically contains circuitry that a battery charger interacts with while charging the rechargeable battery. For example, it is common for a rechargeable battery pack to include a thermal sensing component, such as a thermistor, so that the charger can monitor battery temperature. It is also conventional to include a memory device in the rechargeable battery pack. The memory device can be used to store battery identification and other information, allowing the charger to use appropriate voltage and charge current level. Typically each circuit element that the charger interacts with in a rechargeable battery has a dedicated contact to allow the charger circuitry to access or interact with the circuit element. Of course, the charger requires a mating contact for each battery contact in order to access the corresponding circuit in the rechargeable battery. Each contact on both the battery and charger adds to the direct material cost of the system, and adds to the likelihood of a defect occurring, adding to the cost of manufacturing. Reducing the number of contacts would therefore tend to decrease the cost to manufacture both the charger and the rechargeable battery.

Accordingly, there is a need for charging a rechargeable battery pack with a multiplexed contact.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The embodiments disclosed here include an electrical device having a power contact and an information contact with a memory element coupled between the power contact and the information contact. The electrical device further includes a sensor circuit coupled in series with a first switch element between the power contact and the information contact, and a presence indication circuit coupled in series with a second switch element between the power contact and the information contact. A timed switch control circuit responsive to an application of a voltage between the power contact and the information contact that maintains the second switch closed and the first switch open initially upon the application of the voltage, and after a period of time after the application of the voltage opens the second switch and closes the first switch.

Figure 1:
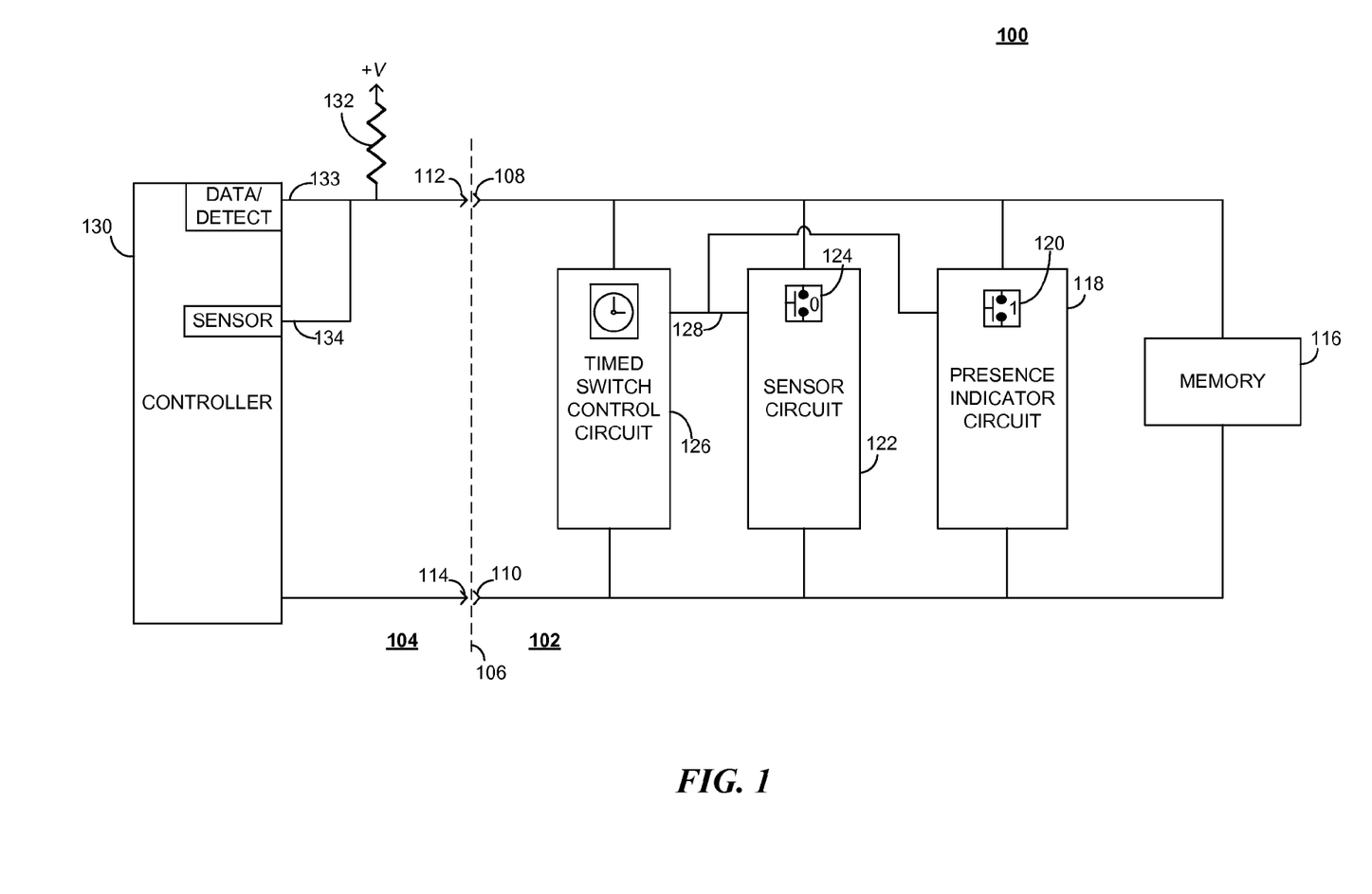
FIG. 1 is a block diagram of device and system using a time differentiated multiplexed contact, in accordance with some embodiments.

FIG. 1 is a block diagram of device and system 100 using a time differentiated multiplexed contact, in accordance with some embodiments. The system 100 includes a first electrical device 102 which can be electrically coupled to a second electrical device 104. The second electrical device 104 interacts with the first electrical device 102 via an interface 106 comprised of a series of electrical contacts. A contact is an electrically conductive member that is used to make physical contact with a corresponding contact. Contacts are made in a variety of shapes and sizes and can be sprung or mechanically biased, designed to interleave as in connectors, and so on. As used here, the term "connected to," or "coupled to" a contact means an electrical connection using suitable electrically conductive materials, i.e. wiring, circuit boards, and so on. The first electrical device 102 has a first information contact 108 that corresponds to a second information contact 112 of the second electrical device 104. The first electrical device 102 also includes a return contact such as a first power contact 110 that corresponds to a second power contact 114 of the second electrical device 104. The first electrical device includes several circuits coupled, electrically, between the first information contact 108 and the first power contact 110, such as a memory 116. The memory 116 contains information that can be used by the second electrical device 104, and that the second electrical device 104 can read the memory 116 via the information contacts 108, 112. Information stored in the memory 116 can include parameters or other descriptive information about the first electrical device 102. The memory 116 can be programmable in some embodiments so that the second electrical device 104 can write new information or update existing information in the memory 116. As arranged here, the memory 116 is a first circuit element with which the second electrical device interacts upon coupling the first and second devices 102, 104 to each other.

The first electrical device 102 further includes a sensor circuit 122 coupled between the information contact 108 and the power contact 110. As arranged here, the sensor circuit is a second circuit element with which the second electrical device interacts, subsequent to interacting with the memory 116. The sensor circuit provides a signal to the second electrical device 104 via the information contacts 108, 112, that is indicative of a measurement of some quantity being sensed by the sensor circuit. Examples of quantities that may be measured and indicated by the sensor circuit can include temperature, pressure, or any other quantity that can be converted to an electrical signal. The sensor circuit is selectively enabled or disabled by a first switch element 124. The first switch element 124 alternatively connects or disconnects the sensor circuit 122 from the information contact 108 responsive to a switch signal on line 128 that is provided by a timed switch control circuit 126.

The first electrical device 102 can further include a presence indicator circuit 118 that indicates the presence of the first electrical device 102 to the second electrical device 104 upon coupling the first and second electrical devices 102, 104 together (i.e. their contacts 108, 112, and 110, 114 coming into contact). The presence indicator circuit 118 is likewise coupled between the first information contact 108 and the power contact 110, and is selectively enabled or disabled by a second switch element 120. The second switch element 120 is also responsive to the switch signal on line 128, but is configured to have a switch state opposite that of the first switch element 124. Thus, when first switch element 124 is open, second switch element 120 is closed. By "open" it is meant the switch element is effectively an open circuit, and by "closed" it is meant that the switch element is essentially a closed circuit. The switch signal on line 128 can alternate between a low, or "0" state, and a high or "1" state. Accordingly, first switch element 124 can be configured to close only when the switch signal is low (or "0"), and the second switch element can be configured to close only when the switch signal is high (or "1").

The timed switch control circuit 126 provides the switch signal on line 128 that controls both the first switch element 124 and the second switch element 120. The timed switch circuit is connected between the first information contact 108 and the first power contact 110, and is responsive to a voltage applied to the first information contact 108 (relative to the first power contact 110). Upon a voltage being applied at first information contact 108, the timed switch control circuit 126 provides a "high" switch signal on line 128 that can be substantially equal to the voltage applied to the first information contact 108. The timed switch control circuit 126 has a timing circuit that causes the switch signal on line 128 to remain high for an initial period after a voltage is applied to the information contact 108, and then switch to a low level (e.g. substantially zero volts relative to the first power contact 110) subsequent to the initial period. The duration of the initial period before the switch signal changes can be configured as desired. The system 100 therefore allows a first electrical device 102 containing two or more different circuits to be accessed by a second electrical device 104 in a time divisioned or differentiated manner using a single contact or connection. The multiplexing of the contact 108, 112 is facilitated by switch elements 120, 124 in each circuit that can have complementary switch states, and which are controlled by a timed switch circuit 126 that enables one (or more) circuits (e.g. presence indicator circuit 118) during an initial period, and then switches the enablement states so that a second circuit (e.g. sensor circuit 122) is enabled and accessible and the previously enabled circuit or circuits are disabled after the initial period. The multiplexed system reduces the number of contacts necessary between the devices, thereby reducing manufacturing costs as well as defect opportunities.

Figure 2:
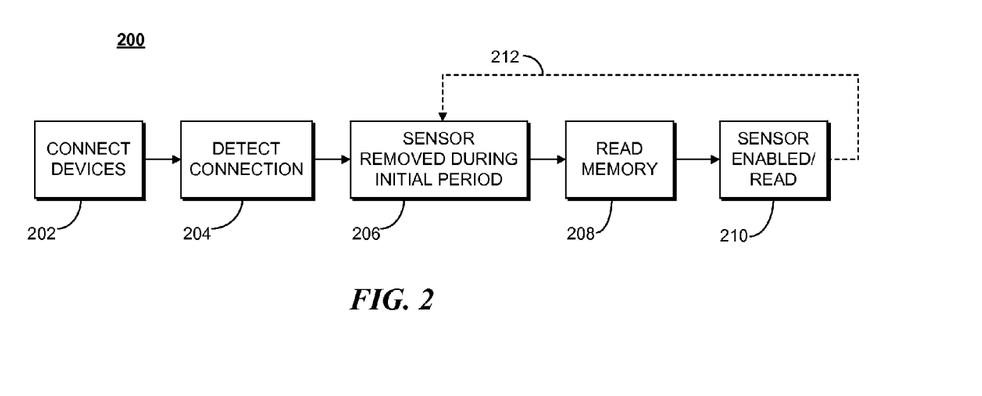
FIG. 2 is a flowchart of a method of using a time differentiated multiplexed contact between two devices, in accordance with some embodiments.

FIG. 2 is a flowchart of a method 200 of using a time differentiated multiplexed contact between two devices, in accordance with some embodiments. The devices 102, 104 of FIG. 1 can serve as an example. The method 200 starts upon connecting the two devices 102, 104 together, as indicated in process block 202. The first and second information contacts 108, 112 come into contact, and the first and second power contacts 110, 114 come into contact. A bias voltage is applied to the information contacts 108, 112 via a bias resistor 132 in the second electrical device 104 that is connected between a voltage source and the second information contact 112. The bias voltage causes the timed switch control circuit 126 to provide a high level switch signal on line 128, which enables the presence indicator circuit 118 by closing the second switch element 120. The high level of the switch signal on line 128 causes the first switch element 124 to be open, thereby disabling the sensor circuit 122 during the initial period, while the switch signal on line 128 is high. Since the presence indicator circuit 118 is enabled, the second electrical device 104 can detect the presence of the first electrical device 102, such as by a controller 130 using a data/detect input 133, or equivalent input, as indicated by the process box 204. Furthermore, the sensor circuit 122 is disabled or removed from connection with the information contact 108 during the initial period since the high switch signal on line 128 disables the first switch element 124, as indicated in process box 206. Upon detecting the first electrical device 102, the second electrical device 104 can then read the memory 116, as indicated in process box 208. Upon expiration of the initial period, the timed switch control circuit 126 switches the switch signal on line 128 from its initial high level to a low level, causing the second switch element 120 to open, disabling the presence indicator circuit 118, and causing the first switch element 124 to close, enabling the sensor circuit 126. Thereafter, the second electrical device 104 can read or sense the signal provided at the information contacts 108, 112 as indicated by process box 210, such as by using a sensor input 134, which can be, for example, an analog to digital converter input. In some embodiments the process can be partially repeated, as indicated by dashed line 212, by re-initializing the bias voltage at the information contacts 108, 112 (e.g. by removing and re-applying the bias voltage source provided by resistor 132).

Figure 3:
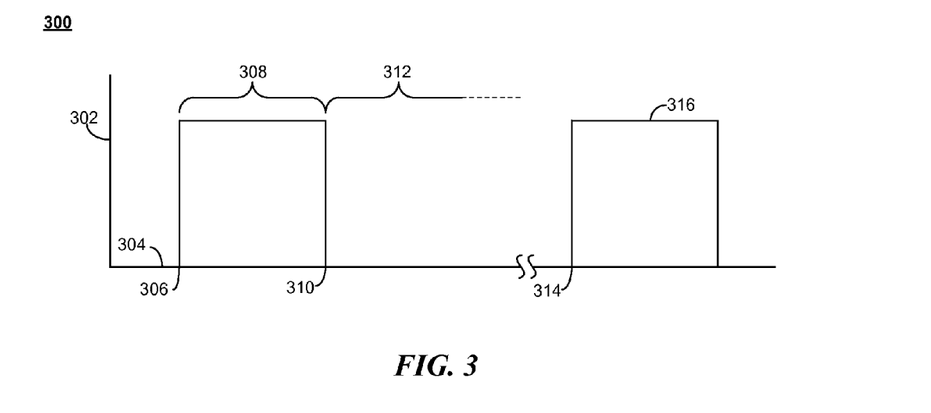
FIG. 3 is a timing diagram of a control signal for a time differentiated multiplexed contact between two devices, in accordance with some embodiments.

FIG. 3 is a timing diagram 300 of a switch signal for a time differentiated multiplexed contact between two devices, in accordance with some embodiments. The timing diagram 300 can represent the switch signal on line 128 of FIG. 1. The vertical axis 302 represents the relative magnitude of the switch signal (e.g. on line 128 in FIG. 1) in volts, and the horizontal axis 304 represents time. Initially, at the origin of the graph chart, the first and second devices 102, 104 are not connected, hence the switch signal is low (not present). At time 306, the devices 102, 104 are connected; the bias voltage is applied to the first information contact 108 (using the example of FIG. 1), causing the switch signal to assert high (e.g. change to a "high" state) during an initial period 308. During the initial period 308, the second electrical device 104 can read the memory 116 in the first electrical device 102. At time 310, the timing circuit in the timed switch control circuit 126 expires and the switch signal reverts to a low level in the time 312 subsequent to the initial period 308. After the initial period 308, in the subsequent period 312, the second electrical device 104 can read or receive signals from the sensor circuit 122, or interact with some other circuit in the first electrical device that is enabled or disabled by the first switch element 124. As indicated by the dashed line 212 of FIG. 2, the processes can be repeated. Thus, at time 314, while the first and second electrical devices are still connected, and without breaking the connection, the bias voltage can be momentarily removed from the information contacts 108, 112, and then re-applied, causing a repeat 316 of the initial period 308 where the switch signal is high. The second electrical device 104 can then interact with (e.g. read, write, or both) the memory 116 again. Upon expiration of the repeated initial period 316, the switch signal again reverts to the low state, and the second electrical device 104 can resume interaction with sensor circuit 122.

Figure 4:
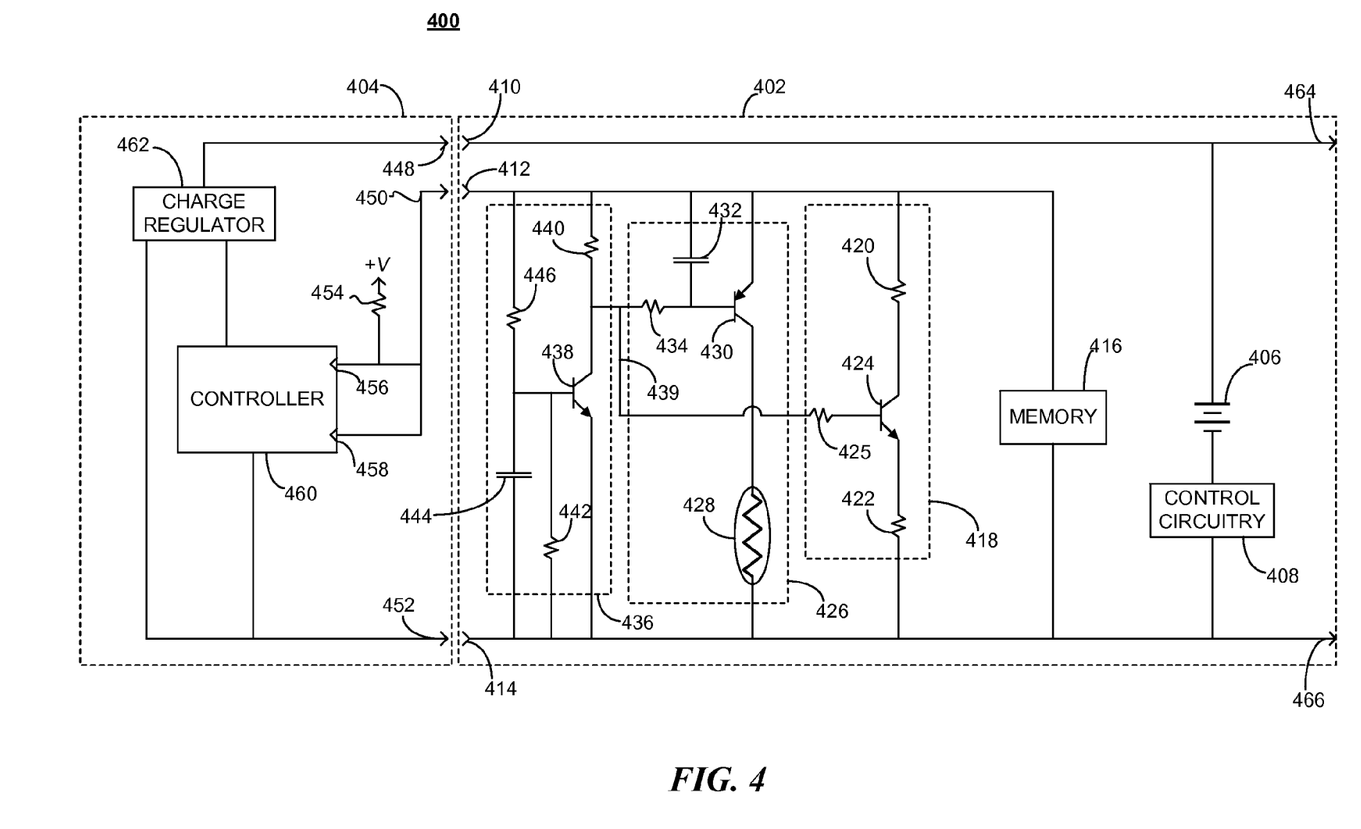
FIG. 4 is a schematic diagram of a rechargeable battery system using a time differentiated multiplexed contact, in accordance with some embodiments.

FIG. 4 is a schematic diagram of a rechargeable battery system 400 using a time differentiated multiplexed contact, in accordance with some embodiments. In the system 400, a rechargeable battery pack 402 is analogous to the first electrical device 102, and a battery charger 404 is analogous to the second electrical device 104 of FIG. 1. The rechargeable battery pack 402 includes one or more rechargeable battery cells 406 that may be connected in series with a control circuit 408. The control circuit 408 can interrupt the connection of the rechargeable battery cells 406 upon the occurrence of adverse electrical conditions, such as an over voltage condition during charging, or an under voltage condition resulting from discharge. The rechargeable battery includes a set of battery contacts including a positive battery contact 410, and battery information contact 412, and a negative battery contact 414. Both the positive and negative battery contacts 410, 414 are power contacts. The rechargeable battery pack 402 can further include a set of device contacts such as positive device contact 464 and negative device contact 466. The device contacts 464, 466 correspond to contacts of a host device that the rechargeable battery pack 402 is used to power. The arrangement of the set of battery contact 410, 412, 414 and the host contacts 464, 466 allows the rechargeable battery to be mounted on, or otherwise coupled a host device and to be connected to the battery charger 404 at the same time.

Likewise the battery charger 404 comprises a set of corresponding charger contacts, including a positive charger contact 448, a charger information contact 450, and a negative charger contact 452. The battery charger 404 includes a charger regulator 462 that is a controlled, regulated electrical power source that provides a charge current and voltage to recharge the rechargeable battery cells 406 in the rechargeable battery 402. The charge regulator 462 can be controlled by a controller 460 which can provide on/off control, as well as level control for adjusting the output level of current and voltage to the rechargeable battery 402. The battery charger also includes a bias resistor 454 coupled between a voltage source (+V) and the charger information contact 450. When the rechargeable battery 402 is coupled or connected to the battery charger 404, a voltage is applied to the battery information contact 412 through the bias resistor 454. The controller 460 can read data via the information contacts 412, 450 at a data input 456, and can read sensor information via the information contacts at a sensor input 458. In some embodiments the data and sensor inputs may be a single input.

The rechargeable battery includes a memory 416, a sensor circuit 426, and a timed switch control circuit 436. In some embodiments the rechargeable battery also includes a presence indicator circuit 418. Prior to connection to the battery charger 404, there is no voltage difference between the battery information contact 412 and the negative battery contact 414 due, at least in part, because of a resistance path in the timed switch control circuit 436 created by voltage divider resistors 446 and 442. Accordingly, timing capacitor 444 has no charge stored in it, and likewise has no voltage across it prior to the rechargeable battery 402 being connected to the battery charger 404.

Upon connecting the rechargeable battery 402 to the battery charger 404, the bias voltage provided by pull up resistor 454 is applied to the battery information contact 412 via the charger information contact 450. At that point, timing capacitor 444 begins charging, and the voltage across the timing capacitor and resistor 442 is initially insufficient to cause timing transistor 438 to close, so it remains in a high impedance state between resistor 440 and the negative battery contact 414 while timing capacitor 444 charges and the voltage across the timing capacitor increases. While timing transistor 438 is in the high impedance state, the bias voltage is divided across bias resistor 454 of the battery charger 404, and a series path of resistor 440 in the timed switch control circuit 436, resistor 425 of the presence indicator circuit 418, as well as the base-emitter junction of presence transistor 424 and resistor 422 of the presence indicator circuit 418, causing presence transistor 424, which is analogous to second switch element 120 of FIG. 1, to close (e.g. low collector-emitter impedance), creating a voltage divider of resistors 420, 422. With presence transistor 424 switched closed, coupling resistors 420 and 422 in series between the battery information contact 412 and the negative battery contact 414, a resistive load is therefore present between the battery information contact 412 and the negative battery contact 414, forming a voltage divider with the bias resistor 454, causing the voltage at the controller inputs 456, 458 to drop from the +V level. The drop in voltage can be detected and used to indicate that the rechargeable battery 402 has been connected to the battery charger 404. Upon detection of the rechargeable battery 402 being connected to the battery charger 404, the battery charger can then commence reading the memory 416 using, for example, a conventional single wire protocol. Generally, the data input 456 is varied between a high and low state in a predefined sequence that triggers the memory 416 to transmit data contained in the memory 416. Likewise, the battery charger 404 can write to the memory 416 using a single wire protocol. Once the controller 460 is finished interacting with the memory 416 it can configure the data input 456 to a high impedance state so as not to interfere with sensor signals at the information contacts 412, 450.

As the timing capacitor 444 charges during the initial period after voltage is applied at the battery information contact 412, the presence transistor 424 remains closed. At the same time, the sensor transistor 430 in the sensor circuit remains open (e.g. high impedance) since the base terminal is pulled up by resistor 434. Capacitor 432 prevents switching of the sensor transistor 430 while battery charger 404 is communicating with the memory 416. At some time after the initial application of voltage to the battery information contact, i.e. after connecting the rechargeable battery 402 to the battery charger 404, the voltage across the timing capacitor 444 and resistor 442 is sufficient to cause the base-emitter junction of timing transistor 438 to start conducting, causing the timing transistor 438 to switch from a high impedance, open state to a low impedance, closed state, changing the state of a switch signal on line 439, which is analogous to line 128 of FIG. 1. Once the timing transistor 438 closes, resistors 440 and 434 are essentially connected to the negative battery contact 414, causing presence transistor 424 to switch to an open state, and sensor transistor 430 to switch to a closed state. When presence transistor 424 opens, the resistors 420, 422 are essentially disconnected from each other and they have a negligible loading effect on the battery information contact. When the sensor transistor 430 is closed, a thermistor 428 is connected to the battery information contact 412, and forms a voltage divider with bias resistor 454. Accordingly, the voltage at the information contacts 412, 450 and sensor input 458 will be proportional to the values of the bias resistor 454 and the resistance of the thermistor 428, which varies with temperature. Thus, the battery charger 404 can monitor the temperature of the rechargeable battery 402 while charging the rechargeable battery 402. During this time, after the initial period, while the sensor circuit is active the memory 416 maintains a high impedance state, which does not substantially load the thermistor 428. It will be appreciated by those skilled in the art that switch transistors 424, 430, and 438 can be bipolar junction transistors as shown, or in some embodiments they can be other types of transistors such as, for example, metallic oxide semiconductor field effect transistors (MOSFETs). Furthermore, it should be noted that switch transistors 424 and 438 are NPN type bipolar junction transistors, while switch transistor 430 is a PNP type bipolar junction transistor. Furthermore, in some embodiments, the bias voltage provided to the battery information contact 412 can be removed from the battery information contact 412, resetting the timed switch circuit 436, to re-initiate the process and allow further interaction with the memory 416, and then resume interaction with the sensor circuit 426.

Figure 5:
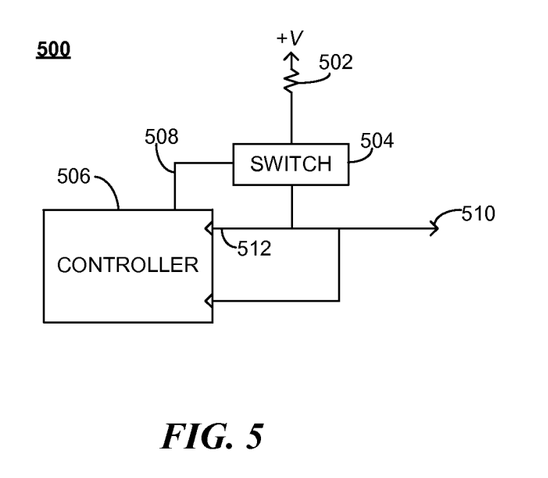
FIG. 5 is a schematic of a switch control for re-initializing a time differentiated multiplexed contact, in accordance with some embodiments.

FIG. 5 is a schematic of a switch control circuit 500 for re-initializing a time differentiated multiplexed contact, in accordance with some embodiments. A bias resistor 502 is connected in series with a switch 504 between a voltage source (+V) and an information contact 510. The switch 504 is responsive to a switch signal on line 508 that can be provided by a controller 506. The switch 504 can be a simple transistor switch to connect and disconnect the bias resistor 502 from the information contact 510. Once the bias resistor 502 is connected, the initial period (e.g. period 308 of FIG. 3) commences, and the controller 506 can interact with a first circuit element in the rechargeable battery (or other electrical device). After the timed switch circuit changes state (e.g. period 312 of FIG. 3), the controller can interact with the sensor circuit in the rechargeable battery, or some other circuit that has then been enabled by the timed switch circuit. Alternatively, switch 504 could be connected effectively in series with the bias resistor 502 between the information contact 510 and the negative charging contact (e.g. ground). In another alternative, the input 512 may be capable of sinking sufficient current to effectively operate as a switch in series with the bias resistor 502 to remove the bias voltage from the information contact 504.

Accordingly, the disclosed system provides an advantage over the prior art by allowing a first electrical device containing two or more different circuits to be accessed by a second electrical device in a time divisioned or differentiated manner using a single contact or connection. The multiplexing of the contact is facilitated by switch elements in each circuit that can have complementary switch states, and which are controlled by a timed switch circuit that enables one (or more) circuits during an initial period, and then switches the enablement states so that a second circuit is enabled and accessible and the previously enabled circuit or circuits are disabled after the initial period. The multiplexed system reduces the number of contacts necessary between the devices, thereby reducing manufacturing costs as well as defect opportunities.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electrical device, comprising:
   a power contact and an information contact;
   a memory element coupled between the power contact and the information contact;
   a sensor circuit coupled in series with a first switch element between the power contact and the information contact;
   a presence indication circuit coupled in series with a second switch element between the power contact and the information contact; and
   a timed switch control circuit responsive to an application of a voltage between the power contact and the information contact that maintains the second switch element closed and the first switch element open initially upon the application of the voltage, and after a period of time after the application of the voltage opens the second switch element and closes the first switch element, wherein the timed switch control circuit comprises:
   a pair of voltage divider resistors coupled in series between the power contact and the information contact;
   a timing capacitor coupled in parallel with one of voltage divider resistors;
   a control switch element having an input responsive to a voltage across the timing capacitor, the control switch element further coupled in series with a control resistance between the power contact and the information contact forming a control node, the control node further coupled to an input of each of the first and second switch elements.

2. The electrical device of claim 1, wherein the power contact is a negative battery contact, the electrical device further comprises a positive battery contact and at least one rechargeable battery cell operably coupled between the positive and negative battery contacts.

3. The electrical device of claim 2, further comprising a set of device contacts including a positive device contact coupled to a positive terminal of the at least one rechargeable battery cell and a negative device contact coupled to a negative terminal of the at least one rechargeable battery cell.

4. The electrical device of claim 1, wherein the sensor circuit comprises a thermistor.

5. The electrical device of claim 1, wherein the presence indication circuit comprises a resistance divider circuit.

6. The electrical device of claim 1, wherein the first and second switch elements are transistor switches.

7. A rechargeable battery system, comprising:
   a rechargeable battery pack having a negative battery contact and a battery information contact, a memory element coupled between the negative battery contact and the battery information contact, a presence indication circuit coupled in series with a second switch element between the negative battery contact and the battery information contact, a sensor circuit coupled in series with a first switch element between the negative battery contact and the battery information contact, and a timed switch control circuit responsive to an application of a voltage between the negative battery contact and the battery information contact that maintains the second switch closed and the first switch open during an initial period upon the application of the voltage, and after the initial period opens the second switch and closes the first switch, wherein the timed switch control circuit comprises:
   a pair of voltage divider resistors coupled in series between the power contact and the information contact;
   a capacitance coupled in parallel with one of voltage divider resistors;
   a control switch element having an input responsive to a voltage across the capacitance, the control switch element further coupled in series with a control resistance between the power contact and the information contact forming a control node, the control node further coupled to an input of each of the first and second switch elements; and
   a battery charger having a negative charger contact that mates with the negative battery contact and a charger information contact that mates with the battery information contact and a sensor line coupled to the charger information, a bias resistance coupled between the charger information contact and a voltage source, wherein the bias resistance provides the voltage to the battery information contact, wherein upon the rechargeable battery pack being coupled to the battery charger, the battery charger detects the battery and interacts with the memory via the data line during the initial period, and interacts with the sensor circuit after the initial period.

8. The rechargeable battery system of claim 7, wherein the sensor circuit comprises a thermistor.

9. The rechargeable battery system of claim 7, wherein the presence indication circuit comprises a resistance divider circuit.

10. The rechargeable battery system of claim 7, wherein the first and second switch elements are transistor switches.

11. The rechargeable battery system of claim 7, wherein the battery charger further comprises a switch coupled in series with the bias resistance.

12. The rechargeable battery system of claim 7, wherein the data line is configured in a high impedance state after the initial period.

13. A rechargeable battery pack, comprising:
   a positive power contact, a negative power contact, and an information contact;
   at least one rechargeable battery cell coupled in series between the positive and negative power contacts;
   a memory element coupled between the negative power contact and the information contact;
   a sensor circuit coupled in series with a first switch element between the negative power contact and the information contact; and
   a timed switch control circuit responsive to an application of a voltage between the power contact and the information contact that maintains the first switch open initially upon the application of the voltage, and after a period of time after the application of the voltage closes the first switch, wherein the timed switch control circuit comprises:

a pair of voltage divider resisters coupled in series between the power contact and the information contact;

a capacitance coupled in parallel with one of voltage divider resistors; and a control switch element having an input responsive to a voltage across the capacitance, the control switch element further coupled in series with a control resistance between the power contact and the information contact forming a control node, the control node further coupled to an input of each of the first and second switch elements.

14. The rechargeable battery pack of claim 13, further comprising a presence indication circuit coupled in series with a second switch element between the negative power contact and the information contact; wherein the timed switch control circuit maintains the second switch closed initially upon the application of the voltage, and after a period of time after the application of the voltage opens the second switch.

15. The rechargeable battery pack of claim 14, wherein the presence indication circuit comprises a resistance divider circuit.

16. The rechargeable battery pack of claim 13, wherein the sensor circuit comprises a thermistor.

* * * * *